Figure 1:
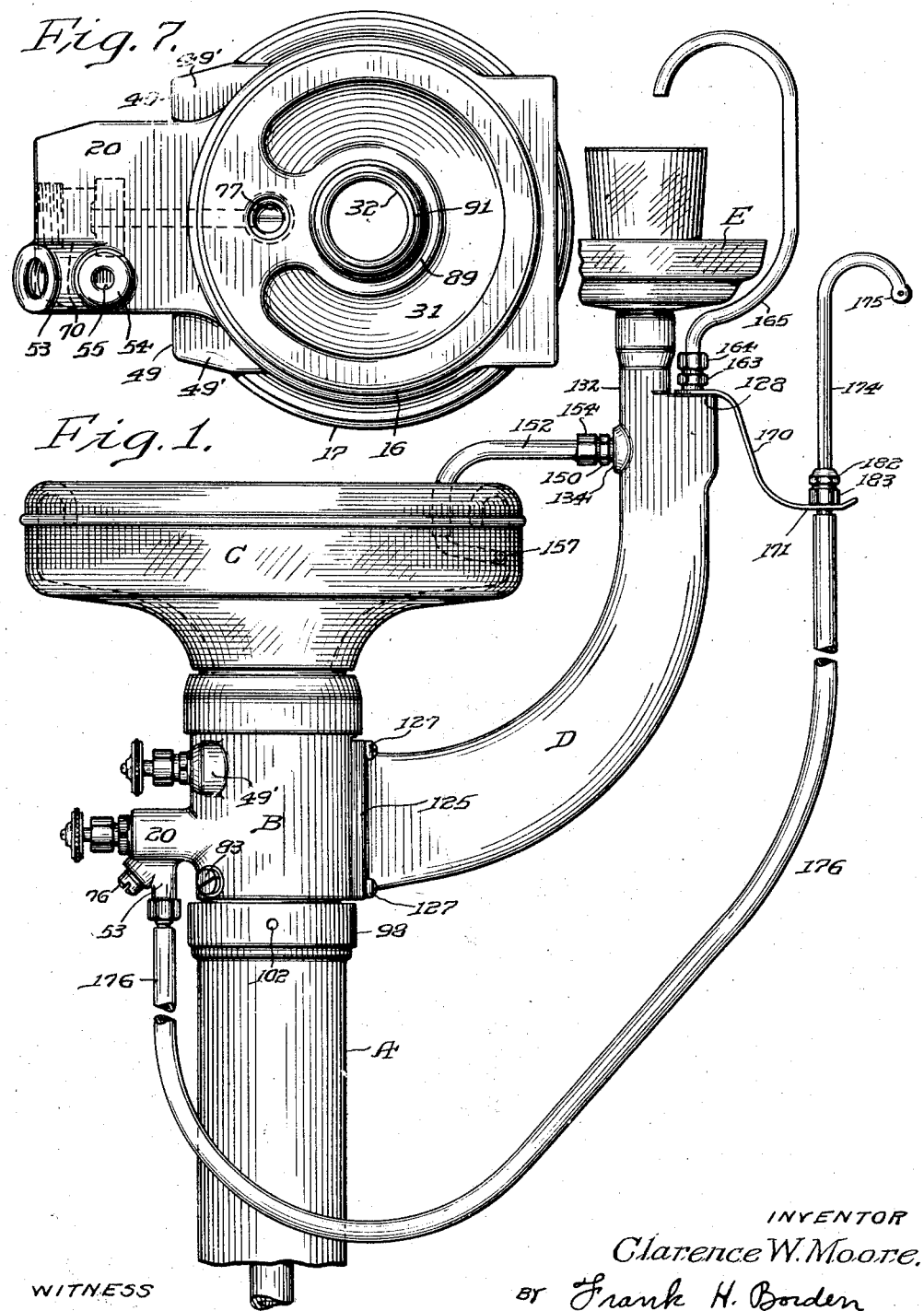

April 15, 1930. C. W. MOORE 1,754,757
FOUNTAIN CUSPIDOR
Filed Nov. 30, 1926 6 Sheets-Sheet 1

INVENTOR
Clarence W. Moore.
BY Frank H. Borden
ATTORNEY

WITNESS
F. J. Hartman.

April 15, 1930. C. W. MOORE 1,754,757
FOUNTAIN CUSPIDOR
Filed Nov. 30, 1926 6 Sheets-Sheet 2

WITNESS
F. J. Hartman.

INVENTOR
Clarence W. Moore.
BY Frank H. Borden
ATTORNEY

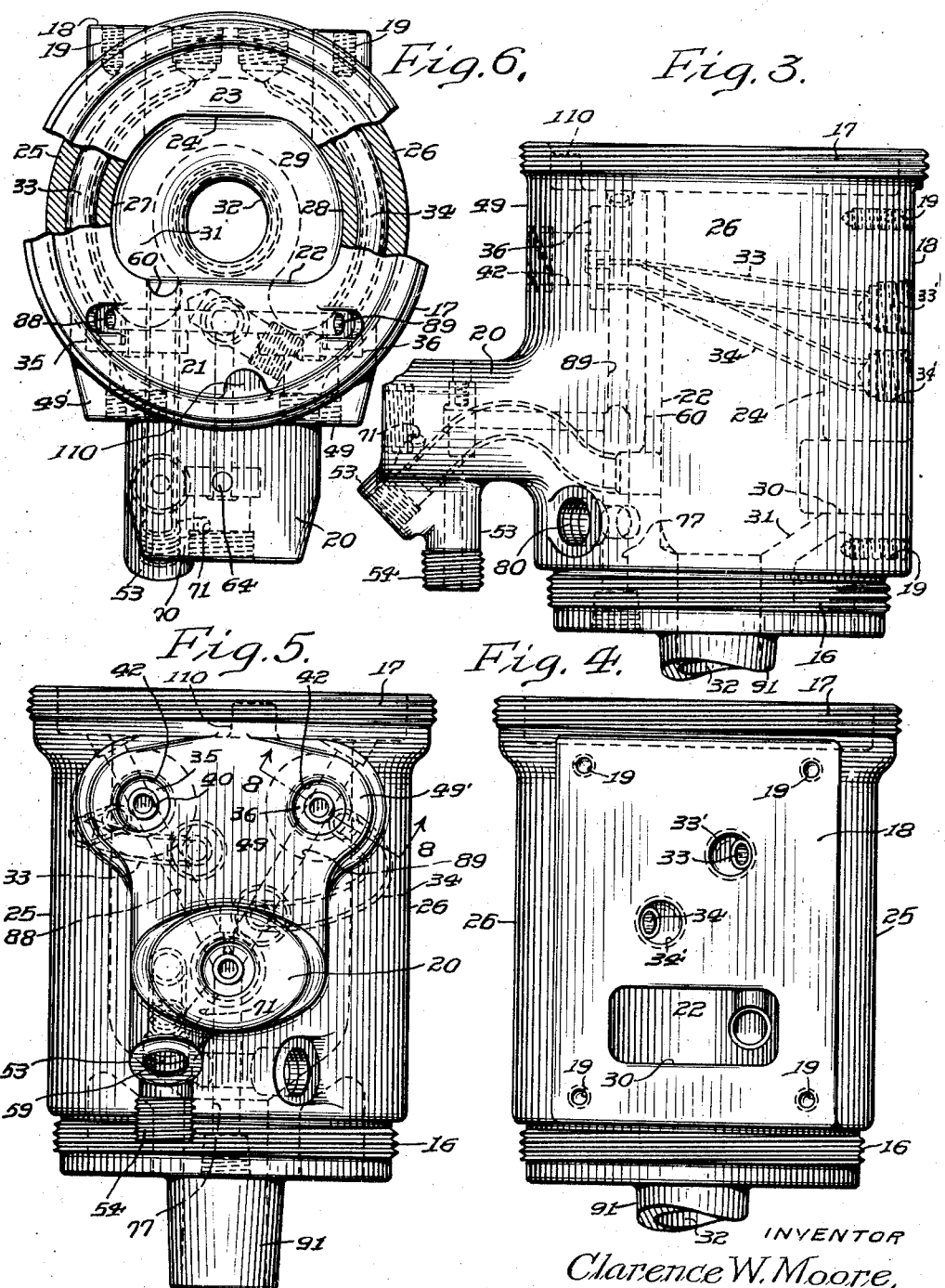

April 15, 1930.  C. W. MOORE  1,754,757
FOUNTAIN CUSPIDOR
Filed Nov. 30, 1926  6 Sheets-Sheet 4

INVENTOR
Clarence W. Moore.
by Frank H. Borden
ATTORNEY

WITNESS

April 15, 1930.                C. W. MOORE                1,754,757
                              FOUNTAIN CUSPIDOR
                           Filed Nov. 30, 1926        6 Sheets-Sheet 5
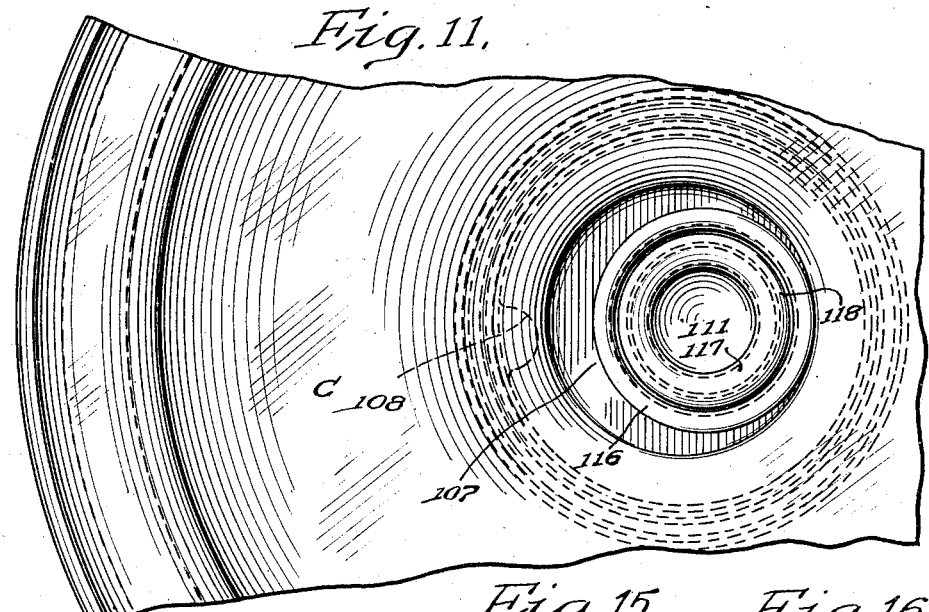
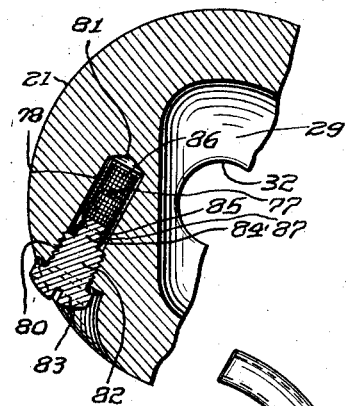
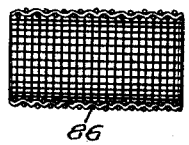
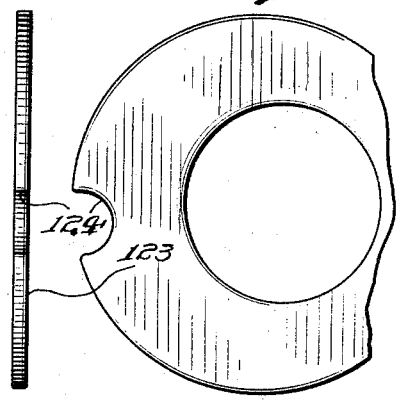
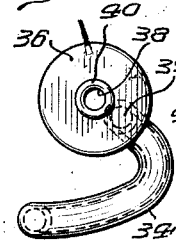
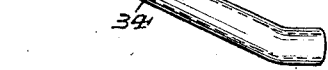
INVENTOR
Clarence W. Moore.
BY Frank H. Borden
ATTORNEY
WITNESS
F. J. Hartman.

April 15, 1930.  C. W. MOORE  1,754,757
FOUNTAIN CUSPIDOR
Filed Nov. 30, 1926  6 Sheets-Sheet 6
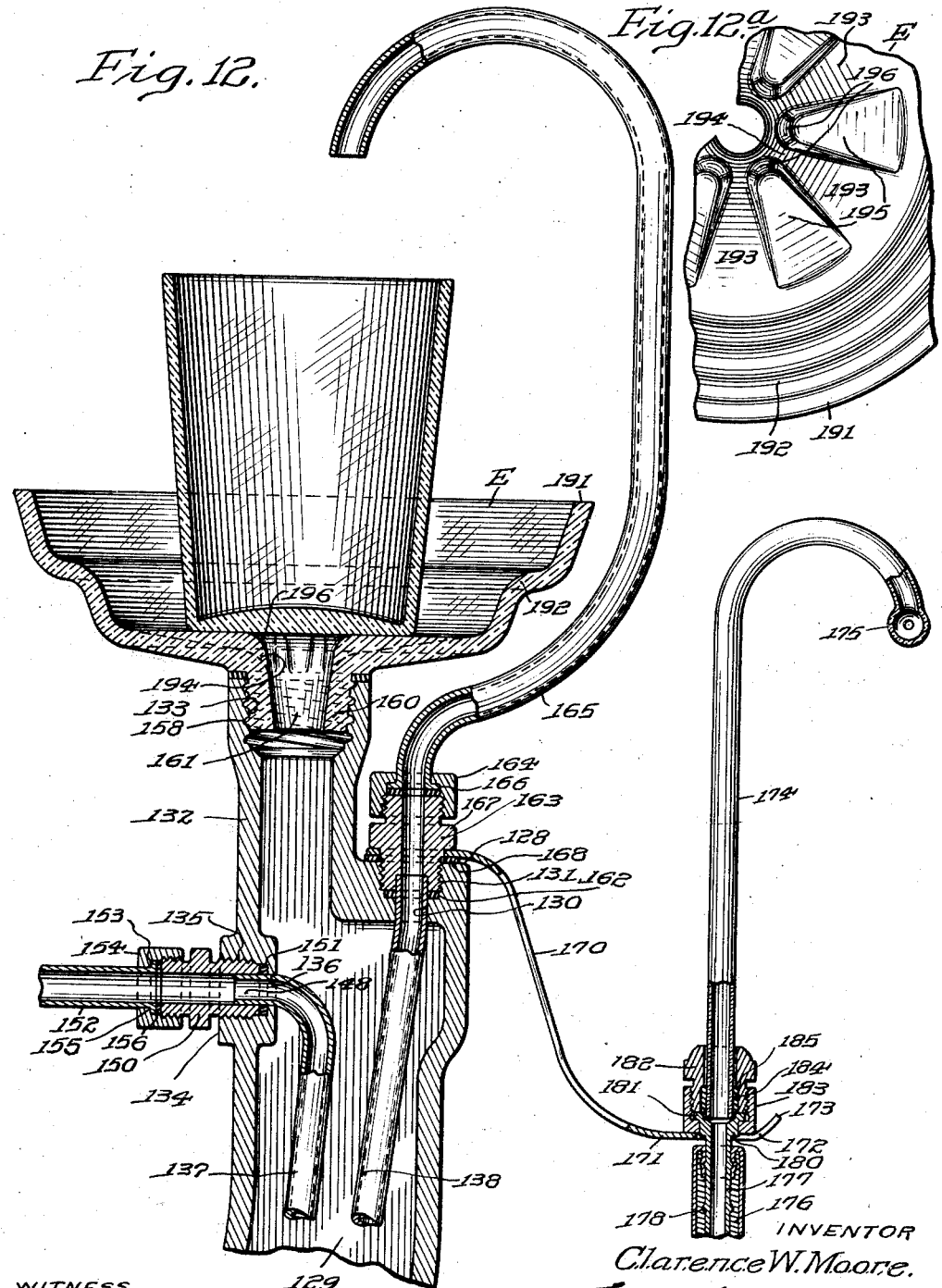

Patented Apr. 15, 1930

1,754,757

UNITED STATES PATENT OFFICE

CLARENCE W. MOORE, OF ROSLYN, PENNSYLVANIA, ASSIGNOR TO RITTER DENTAL MANUFACTURING COMPANY, INC., OF ROCHESTER, NEW YORK, A CORPORATION OF DELAWARE

FOUNTAIN CUSPIDOR

Application filed November 30, 1926. Serial No. 151,736.

This invention relates to fountain cuspidors, with particular reference to cuspidors used in the professions, such as dentistry and medicine.

Some of the objects of the invention are; to provide a cuspidor of efficiency and compactness; to provide a cuspidor which is silent as to drainage; to provide improvements in valve constructions for cuspidors; to provide in a cuspidor a supply or distributing head of a single unitary casting; to provide in a cuspidor a unitary element through which all of the supply and drainage fluid passes; to reduce the labor formerly necessary in constructing cuspidors; to provide a cuspidor of decreased weight without adversely affecting its strength and with an enhancement of its attractiveness; to provide the control valves of cuspidors as pre-formed inserted units; to provide in a cuspidor a saliva ejector discharging into the main drain of the device below the bowl and functioning without the interpositioning of valves or other devices to prevent splashing of drainage water into the ejector; to provide a cuspidor with an improved strainer for the water supply; to provide means for supporting the mouth tube of a saliva ejector in a position at once convenient to the operator without inconvenience to either operator or patient; to improve the construction of the drinking-glass bowl; to improve generally the construction of cuspidors and in detail the several parts thereof, and many other objects and advantages as will be more apparent as the description proceeds.

Before describing the invention in detail it should be noted that among other items of expense in former constructions of cuspidors, was the labor cost in the formation of the ducts, conduits and similar water passages to and from the valves controlling the several water supply passages. The former construction required accurate machining and drilling, to allow for which castings used were heavy, with thick walls, accounting for appreciable expense for the material alone, and the labor cost added to the cost of material formed an expensive element in the total cost. In large measure both of these features of expense have been reduced in the present invention.

Figure 2:
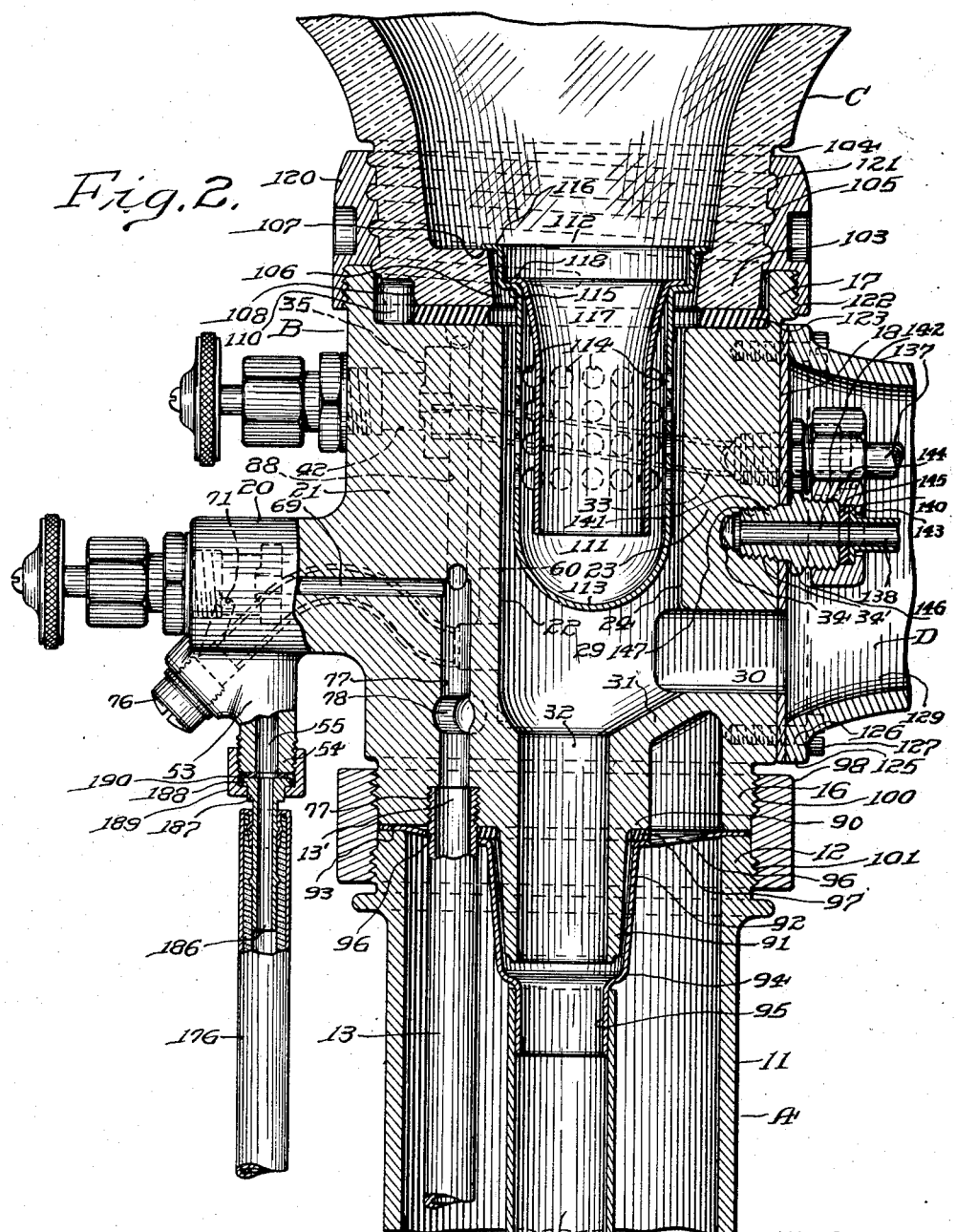
Figure 8:
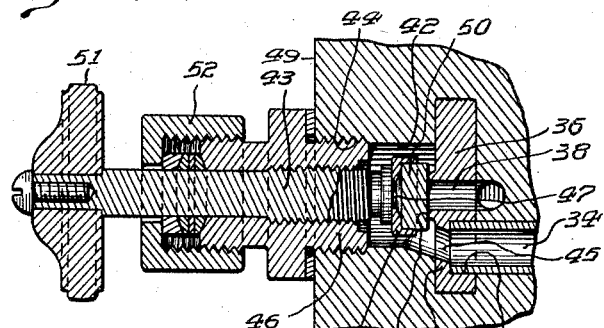
Figure 9:
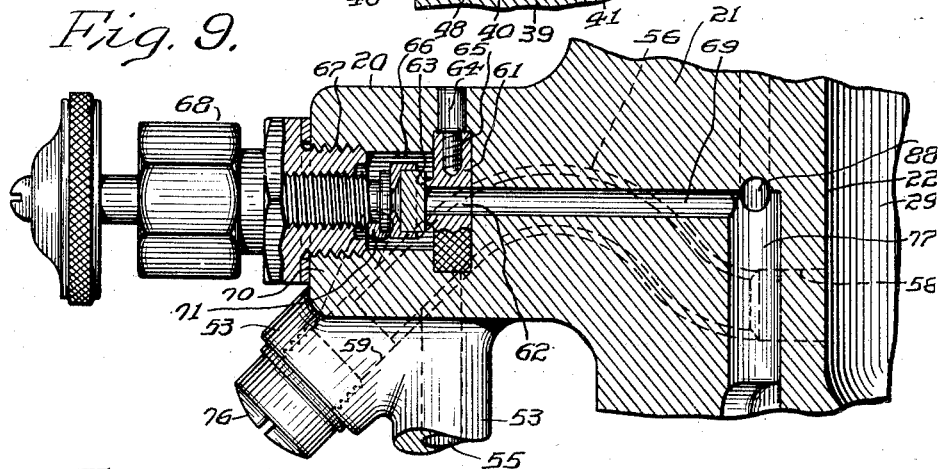
Figure 10:
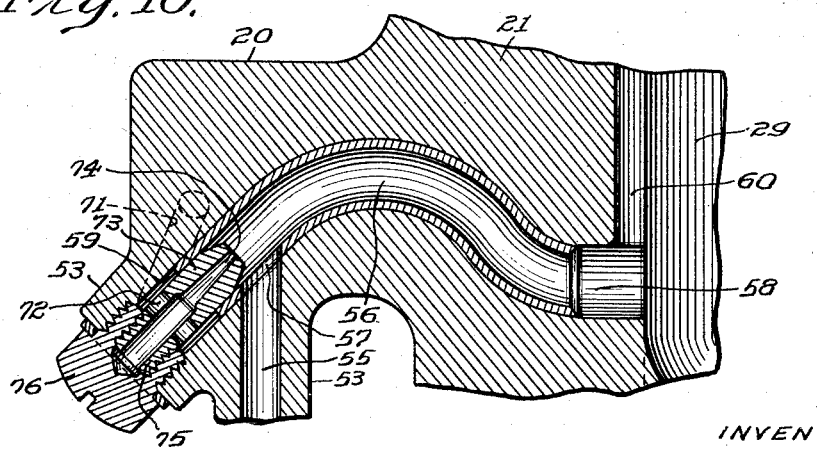

In the accompanying drawings:

Fig. 1, represents a side elevation of an assembled cuspidor according to the invention, Fig. 2, represents a vertical section through the unitary distributing and drainage head, with fragmentary portions of the attached bowl, branch and support, on an enlarged scale, Fig. 3, represents a side elevation of the unitary head of this invention, partially broken away at the base, and showing the location of the several ducts, conduits and passages in dotted lines, Fig. 4, represents another side elevation of the same and showing the branch coupling face, Fig. 5, represents still another side elevation of the same, with the supply pipes or tubes shown in dotted lines, and showing the disposition of the valves, Fig. 6, represents a top plan of the same, partially broken away to show the embedded supply tubes, Fig. 7, represents a bottom plan of the same, Fig. 8, represents a fragmentary section through a wall of the unitary head, disclosing the formation and assembly of a valve controlling a water supply tube, Fig. 9, represents a different fragmentary section through a wall of the unitary head to disclose the construction of the valve controlling the flow of water through the ejector, with the ejector tube shown in dotted lines, Fig. 10, represents a fragmentary section through the ejector tube and the wall in which it is embedded, Fig. 11, represents a fragmentary plan of the cuspidor bowl, showing the eccentric positioning of the outlet thereof, Fig. 12, represents a vertical section, partially in full lines, through the upper end of the branch, showing the construction of the drinking-glass bowl, and the positioning of the pipes in the branch, Fig. 12ª, represents a fragmentary plan of drinking-glass bowl, Fig. 13, represents a fragmentary horizontal section through the strainer and the associated thickened wall in which it is located, showing the strainer assembly, Fig. 14, represents a longitudinal section through the strainer element on an enlarged scale, Fig. 15, represents a side elevation of a washer as inserted between the bowl and distributing head, Fig. 16, represents a top plan of the same, Fig. 17, represents a top plan of a preformed valve seat and supply tube assembly, Fig. 18, represents a side elevation of the same, and Fig. 19, represents an end elevation of the same.

In constructing the cuspidor compactness and economy were among the desiderata, and the cuspidor of this invention affords both. In the preferred form of head, through which all of the drainage from the several elements of the cuspidor passes, as well as the entire water supply for the assembly, it was desired that economy as to metal used as well as economy in subsequent machining operations be employed. Such economies were achieved by the invention of a structure susceptible to formation by a casting operation. As so formed, the valves controlling the water supply are pre-formed and mounted in the head in a novel manner, and water supply conduits from the valves to the several outlets are formed by pre-formed tubes cast in the metal of the head. Drainage from the tumbler bowl and from the saliva ejector is into the drainage passage of the head, beneath the cuspidor bowl and its associated trap.

Referring now to the drawings, it will be noted in Fig. 1, that the invention comprises in its preferred form an assembly of a unitary drainage and distributing head B, carrying at its upper end a cuspidor bowl C, and that a branch D diverges from the head B, carrying at its upper end the tumbler bowl E, and housing the associated water supply conduits to be later described. The assembly is arranged for mounting upon any desired support, as for instance the support A, disclosed.

It will be seen in Fig. 2, that the support A at its upper end is hollow, as at 11, and terminates in a threaded head-coupling member 12. The water supply pipe 13, and drainage conduit 14 are housed in the support A.

The head B, preferably a casting, comprises a hollow sleeve-like body, terminating at the lower end in a threaded coupling member 16, and at the upper end in a bowl coupling member 17. Both coupling members are preferably concentric with the axis of the head. The major portion of the main body of the head is generally annular or cylindrical and is concentric with its axis and with the coupling members, but at one side is provided with a branch coupling face 18, having threaded openings 19 to receive coupling screws of the branch, and on another side, preferably diametrically opposite thereto, the head is provided with a radial projection 20. The wall 21 from which the projection 20 extends is formed of appreciable thickness, having a substantially plane inner face 22, and the wall 23, contiguous to the branch coupling face, and opposite to wall 21, has also a substantially plane inner face 24, parallel with the inner face 22. The thickened walls 21 and 23 are connected by the curved relatively thin walls 25 and 26, having the irregularly curved inner surfaces 27 and 28 respectively. The inner faces 22 and 24, and 27 and 28, form the main drainage passage 29 through the head, and which is generally trapezoidal in outline. The drainage passage 29 thus formed is of substantially uniform diameter from the upper end of the head to well toward the bottom, where an oblong slot 30 pierces the wall 23 from inner face 24 to the surface of the branch coupling face 18, to permit the passage of drainage water from the branch. Beneath the slot 30, the area of the drainage passage 29 is decreased by a web 31 projecting inwardly from the several inner faces of the walls to form the common circular outlet 32, concentric with the axis of the head. It will be noted however, that although the common outlet 32 is concentric with the axis, the major area of the main drainage passage 29 is located laterally of the axis of the head as located by the outlet 32 and coupling members 16 and 17, due to the differing thicknesses of the walls of the head.

For supplying water to the conduits in the branch, to be described later, conduits 33 and 34 are provided in the head, extending from the thickened wall 21, through walls 25 and 26 respectively, and terminating in wall 23. The conduits 33 and 34 comprise tubes, preformed and curved so that in position the ends located in wall 21 are arranged in parallel spaced horizontal relation, and in wall 23 are in spaced relation out of vertical alignment, to permit coupling with conduits in the branch, to be described.

The tubes 33 and 34 terminate in metal valve inserts 35 and 36 respectively, with which they are held in proper association during the casting operation, and which form integral parts of the metal walls after such operation. Each valve insert comprises a disc of metal knurled at its periphery as at 37, to facilitate the grip of the cast metal thereon, and each has an axial bore 38 and a concentric valve seat 40 formed on one face. The disc insert is associated with the pre-formed tube prior to the casting operation, and it is preferred to drill a hole 41 part way through the disc insert from the rear face, close to the axial bore 38, of such diameter as to receive an end of the bent tube to be associated with it. The end of the tube is inserted in the hole 41 and held against movement therein as by means of silver solder, for instance. This leaves a thin web of disc metal 39 between the open end of the tube and the valve side of the insert, which precludes entrance of cast metal into the tube during the casting operation. This construction is preferred as it enables the use of a valve of restricted size compared with the diameter of the tube through which the water is to pass. It will be clear, however, that it is not necessary to leave the thin web of metal 39 over the end of the tube, but that the tube may be inserted into a hole drilled all the way through the disc, and a removable element associated with the end thereof during the casting, and which is withdrawn with the core, (not shown). However associated, the tubes 33 and 34 are held in position with the disc valve inserts or seats 35 and 36, during the casting, in which metal flows about and embraces the rear face, the periphery and the outer portion of the valve seat face of the inserts, as well as the entire tube, but leaving a cylindrical threaded bore or chamber 42 adjacent the valve seat face.

The thickened wall 21 is of such size as to allow for the firm anchoring and embedding of the valve inserts and tubes, with sufficient metal beyond the valve to permit the firm support of an inserted valve stem 43, the threads 44 being formed in the valve chamber or bore 42 to receive the valve stem. In the form of valve assembly shown, to form a complete conduit from the valve chambers to the water supply tubes it is but necessary to drill passages 45 through the thin webs of disc metal over the ends of the respective tubes, preferably at an angle to the bore of each disc. It will be clear that water brought by passages to be described to the rear face of the disc of either valve, will pass through the axial bore, and if the valve is unseated will flow into the valve chamber, through passage 45 into the tube. It will be understood that as far as the valve construction is concerned it is identical for either tube 33 or 34, and the tubes are practically the same, except that they are bent in opposite directions, so that tube 33 is embedded in wall 25, while tube 34 is embedded in wall 26. In casting the tubes in position, the ends remote from the valves may be prolonged in wall 23 until practically flush with face 18, and by a subsequent drilling operation they are terminated in tapering threaded openings 33' and 34' in the face 18.

Each valve chamber 42 is closed by a threaded nipple 46 extending thereinto, in engagement with the threads 44, through which nipple the valve stem 43 extends, the inner end of which carries at 47 a freely rotatable cup 48, in which a resilient valve disc 50 is mounted, arranged for axial engagement with the seat 40. A handle or knob 51 is connected at the outer end of the valve stem 43 in any desired manner, and the whole valve assembly is rendered water-tight by a packing gland 52, as is well known. The valve assembly applies equally well to either valve controlling the passage of water through the conduits 33 and 34. The control devices, the knobs or handles 51 and a part of the valve stem 43 extend beyond the outer periphery of the head above the radial projection and normal to a plane surface 49 formed by shoulders 49' extending from the wall 21, and preferably in a horizontal plane. It will be noted that the tubes or conduits 33 and 34 are located and embedded in the walls of the body and do not affect and are not affected by, the clearance of the drainage passage 29.

Depending from one side of the radial projection 20 is a saliva ejector housing 53, one portion of which is vertical, terminating at the bottom in an ejector tube coupling 54, and axially drilled as at 55 to form a drainage passage intersecting at its upper edge as at 57, the upward bend of a saliva ejector passage or conduit 56. The saliva ejector passage is a tube 56 as shown, which is of an inverted and widened V shape, located wholly in the wall 21 and the integral radial projection 20, in which latter it is located laterally of the center, in alignment with the vertical drainage passage 55 in the housing. The outer end of the saliva conduit remote from the axis of the head or body terminates in an ejector housing or bore 59, and the conduit inclines upwardly from the bore until its apex is in substantial alignment with the outer periphery of the head, when it inclines downwardly through the wall 21, terminating in a drilled opening 58 in the drainage surface 22. In forming the ejector conduit, a pre-formed tube is bent to the desired shape, and includes a hooked portion (not shown) arranged to turn up in the main drainage passage 29, by which hook it is supported during the casting operation. The upturned end may subsequently be removed as by drilling, for which purpose a semi-cylindrical vertical groove 60 is provided in the inner face 22 as a guide for a drill, and the end of the tube and the adjacent metal, (not shown) may be recessed by a horizontal drill passed horizontally through the lateral slot 30 in the head, which slot is in registry with the finished end of the saliva ejector conduit as shown.

A valve for the saliva ejector is formed in the substantial center of the radial projection 20 by embedding a pre-formed valve insert 61 in the projection. This insert is axially bored as at 62, and has a concentric seat 63 formed thereon, and is held in proper vertical position during the casting operation by suitable core means, (not shown) extending into the bore 62, and preferably for a desired distance beyond the insert to form a passage 69 coincident with the bore through which water passes to the valve seat. The insert is held horizontally by some such device as a set-screw 64 extended from a threaded opening 65 in the insert, the outer end of which is gripped by portions of the die during the casting operation, and the projecting portion is later removed as by sawing until the end of the screw and the surface of the projection 20 are substantially flush, in the finished head. A valve chamber 66 is formed in the metal cast about the insert, including a threaded bore 67, to receive a valve 68, similar in all respects to those already described. The water supply passage 69 formed as described or by suitable drilling, extends through the radial projection and wall 21 but does not enter nor communicate with the drainage surface 22, but terminates in substantial alignment with the plane of the rear faces of the valve inserts 35 and 36, at such point as to intersect the main water supply duct to be described.

The saliva ejector tube, and the saliva ejector valve are thus separated laterally by a wall of cast metal 70, and communication between them is had by a transverse duct 71, drilled from the ejector housing 57 to the valve chamber 66. The ejector end of the duct 71 is arranged in registry with a lateral opening 72 of the ejector 73, the tapered axial bore 74 of which terminates adjacent the intersection 57 of the saliva tube and saliva drainage passage 55. The ejector has a threaded rear end 75, removably mounted in an ejector screw 76, closing the ejector bore 59. With the arrangement described water passing around the valve through the axial bore 62, enters the valve chamber 66, passes through duct 71, and is projected from the ejector tip past or by the vertical saliva drainage conduit toward the apex of the tube, and then down to pass into the main drainage passage 29, where it merges with the other drainage material and passes out through the common outlet 32, and in passing exerts suction on the saliva drainage tube in the usual manner.

The main water supply pipe in the pedestal has a threaded end 13', arranged for insertion in the threaded bore 77 in the bottom face of the distributing head B. The bore 77 is prolonged vertically through the wall 21 of the head to intersect the lateral bore 69 to furnish a water supply to the saliva ejector in communication therewith, and is in its turn intersected by a strainer opening 78, drilled or formed horizontally through the wall 21 in a line substantially parallel with a radius, so as not to enter the main drainage passage 29. The strainer opening comprises an outer threaded portion 80 and the strainer housing 81, extending beyond the intersecting bore 77, as shown in Fig. 13.

A strainer plug or support comprising a threaded barrel 82, a slotted head 83, and a reduced shank 84, having a groove or peripheral recess 85 is provided. A strainer blank of rather fine mesh is rolled upon itself to form a cylinder 86, which is slid over the end of the shank 82 of the plug, and firmly held as an axial extension of the shank, by a wire 87 twisted about the strainer cylinder and constricting the rear portion into the groove 83. As thus formed the strainer unit may be inserted longitudinally into the strainer opening and threadably held in position therein with two layers of the mesh interposed between opposite portions of the water supply conduit, in an efficient and effective straining relation, and which strainer can be quickly removed and cleaned or replaced with but little time or expense involved.

To supply water to the valves 35 and 36, two ducts are drilled, as at 88 and 89, from the upper portion of the head behind each valve seat disc respectively, converging upon the end of the water supply duct 77, at its intersection with the lateral bore 69. The outer ends of these ducts are plugged as desired.

At the lower end of the head B, the web forming the common outlet 32, may, if desired, be prolonged to form a tapering discharge tube 91, although this is not essential to the proper functioning of the assembly. The common drainage outlet 32 is arranged for connection with the drainage conduit 14 in the support in a novel and useful manner. The upper end of the drainage conduit may be flanged directly, or through the attachment of a nipple as shown, in which a tapering barrel or tube 92 is spun into a flange 93 at its larger end, and at the smaller end has an internal shoulder 94, and a lower restricted hollow shank 95. The hollow shank is arranged for soldered connection in the end of the drainage conduit 14 so that the nipple forms a substantially integral prolongation of the conduit. The flange 93, is of such diameter as to seat upon the lower face of the coupling member 16, has one or more openings 96, through which the water supply pipe 13 is arranged to extend, and which openings are spaced far enough from the inner surface of the barrel to afford a circular seating surface on the flange, arranged for abutting engagement with a shoulder 90 formed on the lower portion of the head in the plane of the lower face of the coupling member 16. This may be formed on the discharge tube 91 if that is provided. A washer 97 is seated upon the shoulder 90, and is engaged by the seat portion of the flange adjacent the barrel when the head is placed upon a support, at which time the outer periphery of the flange is engaged between the coupling members of the head and of the support, and which engagement effects axial distortion of the flange so that a funnel shape is assumed by the nipple, with consequent vertical pressure on the washer 97, to insure a water-tight joint between the common drainage outlet 32 and the discharge conduit 14. A firm engagement of the head B upon a support A is had by the application of a nut coupling element 98, having oppositely threaded portions 100 and 101, arranged for simultaneously engaging the oppositely threaded coupling members 16 and 12, and rotated by a wrench, (not shown) engaging spanner openings 102. The assembly will be clear, and it will be noted that considerably flexibility is had about the discharge or drainage outlet without affecting its water-tight connection, so that slight variations in the positioning of the water drainage conduit 14 in the support can be permitted.

The cuspidor bowl C has a concentric lower extension 103 extending from an annular or circular shoulder 104, with a thread 105 cast thereon, and is of such diameter as to enter the upper coupling member 17 of the distributing head B. The inner surface of the bowl converges toward a delivery outlet 106 within the extension 103, which, although substantially cylindrical is eccentric to the axis of the bowl, being laterally disposed in the extension by an internal shoulder 107 of varying width within the bowl, as shown in Figs. 2, and 11. The construction thus is one in which opposite walls of the extension are of different thicknesses, and a notch or recess 108 is formed in the side and bottom face at its thickest part as a guide for the positioning of the parts. The upper part of the head is provided with a lug 110 registering with the notch 108.

The shoulder 107 supports a gold trap of conventional description 111, including an outer cylindrical body 112, a closed bottom 113, and having perforations 114. A sleeve 117 has a flange 118, engaging a shoulder 115 of the outer body, and which latter has a flange 116 engaging the shoulder 107. It is to be noted that the gold trap may be of full size and extend within the main drainage passage 29 of the head without affecting the conduits therein.

The bowl C is connected to the head B by means of a coupling nut 120, oppositely threaded as at 121 and 122, arranged for engagement respectively with the threads 105 and coupling member 17. A gasket 123, having a notch or recess 124 is inserted between the bowl and the head.

The branch D is connected to the head B by means of screws 127, passing through holes 126 in an angular flange 125, engaged in the threaded openings 19 in the face 18. The branch D is hollow and preferably oval in cross-section with its vertical dimension the longest, and curves upwardly from the flange, terminating above and to one side of the bowl C. The branch being hollow affords a drainage conduit in registry with the lateral slot 30 in the head B, and thus is in communication with the common outlet 32 thereof. The branch has a gradual taper and at its upper end, remote from the coupling flange, has a horizontal face or shoulder 128, having a tube opening 130 and a threaded bore 131. Perpendicularly of face 128 but laterally thereof, a cylindrical extension of reduced diameter arises, at 132. The cylindrical extension has a threaded opening 133 communicating with the drainage surface 129 of the branch. A cuspidor tube coupling face 134 is provided on the inner or concave surface of the branch, having a threaded bore 135 and a reduced tube opening 136. The walls adjacent the several openings are preferably thickened for strength.

A cuspidor supply pipe 137, and a tumbler supply pipe 138, are housed in the branch. As their connections to the appropriate parts of the head are identical, but one will be described. At the head end of a pipe, a flange 140 is formed, engaged and firmly connected with an adapting nipple 141, by a sleeve nut 142, having a shoulder 143 engaging the flange 140. A washer 145 may be interposed between the shoulder 142 and flange 140. The adapter has an angular wrench receiving portion 146, and the opposite end from the pipe is threaded as at 147 for insertion in either opening 33' or 34'. The adapter has a bore 144.

The upper ends of the pipes differ somewhat, in that 137 has a curve or bend so that a substantially horizontal portion 148, is provided, passing through the tube opening 136, and clamped therein by adapter 150, threaded into opening 135, against resilient washer 151 in the bottom of the opening. A curved cuspidor flushing nozzle 152, terminally flanged at 153, is clamped to the adapter by shoulder 155 of sleeve nut 154. A washer 156 may be inserted between flange 153 and the end of the adapter 150. The nozzle extends over the rim of the bowl C as shown, and has a nozzle tip 157 connected to it.

At the upper end of the branch a tumbler bowl E is mounted, by means of threads 158 on an axially extending shank 160, and which has a central drainage passage 161. The shank extends into extension 132 of the branch. In other constructions of tumbler bowls it has frequently been a matter of guess as to the exact location for the tumbler, due to distractions incident to the professional service in hand. In some previous bowls, the tumbler may land upright, or at an angle to the vertical, or it may catch upon the drainage ribs of the bowl and be precariously perched thereon, to be upset as soon as water from the nozzle is projected toward it, with unpleasant results. In certain constructions the tumbler must be carefully lowered between guiding ribs in order to secure registry with the nozzle stream. Such devices had required concentration for proper positioning of the tumbler, which was difficult to obtain. In the present invention the tumbler either falls over immediately, and noticeably, or it will be in constant registry with the nozzle stream and will not upset under its impact.

The bowl comprises a divergent rim 191, an internal shoulder 192, a series of sloping triangular drainage grooves 193 inclining to the central drainage passage 161, into which they merge by the curved edge 194, the drainage grooves being separated by the triangular tumbler supporting ribs 195, curving at their edges to merge into the drainage grooves, and at their inner edges curved as at 196 in an arc tangent to the curve 194 of the adjacent grooves. The diameter of the bowl in the plane of the upper surfaces of the horizontal supporting ribs is such that a standard tumbler may slide anywhere over the surface without getting out of registry with the supply nozzle. Furthermore a tumbler cannot engage the ribs at an angle without immediately toppling over or of having such a stable positioning as to maintain it under the impact of the nozzle stream.

The tumbler supply pipe 138 has a push connection through tube opening 130 in the shoulder 128, held tightly by a gasket or washer 162 under compression from adapter 163 screwed into opening 131. The other end of the adapter is threaded to receive a sleeve-nut 164, engaging a flange 166 on the drinking nozzle 165. The adapter 163 has a wrench portion 167, and extends through a resilient washer 168 and the eye of a saliva tube hook or support 170. The hook is curved to provide a substantially horizontal portion 171, recessed to form a yoke 172, the tip ends of which 173 are bent up to prevent undesired detachment of saliva tube 174.

The saliva tube and attachment to the flexible hose are conventional, but will be briefly described. The mouth piece 175 is inserted in gland 182, and compressible collar 184, the nipple 177, flanged at 181, is connected to the gland by sleeve nut 183. The nipple has a shoulder 180 slidable in the yoke of the hook. The hose 176 is frictionally engaged with the nipple by ribs 178 thereon. The other end of the hose, from the mouth piece is connected to coupling member 54 on the head, by a nipple 186 frictionally engaged within the hose, having a shoulder 187 and flange 188, engaging washer 190, by nut 189.

The advantages of the invention will be apparent.

I claim as my invention:

1. In a cuspidor a unitary drainage and distributing head comprising a cast metal body having a plurality of communicating drainage passages including a main substantially vertical passage, the walls of the passages being formed of the cast metal, a water distributing system disposed within the cast metal of the head out of contact with the drainage passages and formed in part at least of pre-formed conduits and valve seats, a water inlet being disposed in the lower part of the head toward one side thereof, the discharge from said head being substantially perpendicular to the main drainage passage and on a side of the head peripherally spaced from the water inlet.

2. In a cuspidor a substantially annular distributing head having a central drainage passage, a valve seat formed in the head at one side of the passage, a water supply passage communicating with the valve seat, valve operating means extending from the head in position to function relative the valve seat, and a discharge conduit extending from the valve seat to a point peripherally spaced from said water supply passage but out of contact with said drainage passage, to afford freedom of action for an operator in adjusting the valve operating means without interference from the connections to the discharge conduit.

3. In a cuspidor, a unitary element of generally cylindrical or circular outline, arranged for concentric positioning relative an associated bowl and an associated support, the element having an internal passage through which the entire water supply for the cuspidor passes, a valve in said passage, and valve operating means projecting from the element for controlling said valve, a water passage leading from the valve to a discharge point peripherally spaced from the valve in the element and having another internal passage through which all of the drainage matter of the cuspidor passes, said passage extending between the valve and the discharge point but out of contact therewith.

4. In a cuspidor, a unitary drainage and distributing head having a generally circular outer periphery, said head having a vertical passage the major portion of which is laterally disposed relative the axis of the head, a cuspidor bowl of circular outline having an axial extension arranged for registry with the upper circular end of said head and having an eccentric drainage passage therethrough in registry with the drainage passage in said head, and a gold trap extending into the registering drainage passages.

5. In a cuspidor, a unitary distributing element comprising a casting having a relatively thickened wall at one side and a relatively thin wall adjacent thereto as a continuation thereof, a valve seat formed in the thickened wall and having a valve chamber formed in the wall, the valve seat having a water supply passage leading from it through the relatively thin wall out of contact with the inner surfaces of said walls, the inner surfaces of said walls forming a drainage passage out of contact with the water supply.

6. In a cuspidor, a water distributing head arranged for concentric supporting of a cuspidor bowl and comprising a hollow casting the walls of which are of varying thickness yet of generally circular outer periphery and concentrically disposed relative such bowl, valves mounted in a thicker wall, conduits embedded in the walls and communicating with said valves and terminating in the walls substantially opposite the valves in said thickened wall, said head having an inner drainage passage delineated by the inner surfaces of the walls, said conduits arranged to pass around said passage without contact therewith.

7. In a cuspidor a unitary drainage and distributing element arranged for operative association between a bowl and a support, comprising a hollow body having annular bowl and support coupling members, the wall of the body being thickened radially of the annular coupling members at one point, the element having a vertical drainage passage of which one surface is the inner surface of the thickened wall, valves formed in the thickened wall, a vertical water supply passage being formed in the thickened wall communicating with said valves, conduits disposed in the walls about the drainage passage on either side thereof but out of contact therewith, controlling means for the valves projecting beyond the outer surface of the element, the element arranged to receive a divergent branch on the other side from said controlling means, and means connecting the ends of the conduits to tubes mounted in such branch.

8. In a cuspidor, a distributing head, upper and lower vertically aligned annular coupling members arranged for engagement respectively with a bowl and a support, means for passing a supply of water from such support into said head for distribution therein, a point of distribution being peripherally spaced from the point of entry into said head and said head having a drainage passage arranged for registry with drainage elements of such bowl and such support.

9. In a cuspidor, a drainage head, comprising a hollow casting having walls and an inner drainage passage, a radial projection on a wall, a pre-formed tube bent into a general V shape in integral association with the metal of the wall and the projection, an ejector removably mounted in one end of said tube, the other end of the tube having communication with the vertical drainage passage, a saliva drainage passage being formed in said projection and communicating with said tube adjacent the end of the ejector, and means for projecting water through the ejector and through the tube, said saliva drainage being into the vertical drainage passage of the head.

10. In a cuspidor, a drainage head comprising a body having a vertical drainage passage, arranged for draining registry with a bowl, the head having a lateral slot arranged for draining registry with a divergent branch, and the head having a saliva ejector positioned opposite the slot, and communicating with the vertical drainage passage, the head terminating at the base in a common delivery outlet through which all of the drainage matter of the cuspidor passes.

11. In a cuspidor, a unitary distributing and drainage head comprising a hollow body having walls and a substantially central drainage passage, a projection on one wall, a saliva ejector mounted in the projection and discharging into the drainage passage, a valve seat cast into the body for controlling the action of said ejector, a water supply duct being formed in the wall of the body in communication with said valve.

12. In a cuspidor, a unitary distributing and drainage head comprising a hollow body having walls and a drainage passage delineated by said walls, conduits formed in the walls out of contact with the drainage passage, valves communicating with said conduits and located in one wall, a saliva ejector mounted on the head and communicating with the drainage passage well below the conduits, an ejector valve communicating with the ejector, a water supply duct being formed in the body and communicating with the several valves, out of contact with the drainage passage, and a common outlet on the body through which the entire drainage of the cuspidor passes.

13. In a cuspidor a unit supporting and distributing element arranged for lateral support with a drinking glass branch, and for vertical support of a bowl, and arranged for vertical positioning on a support, comprising a casting, upper and lower annular coupling members, and lateral branch coupling members being formed thereon, and a radial projection extending from one side thereof, a water supply duct being formed in the casting, a plurality of valves mounted in the wall adjacent the projection, an ejector valve mounted in the projection, a saliva ejector located in the projection and communicating with the ejector valve, the valves being in communication with the water supply duct, conduits positioned in the walls and communicating with said valves, the casting having a drainage passage out of contact with said conduits, but in communicating relation to the saliva ejector, and a lateral opening being formed from the drainage passage through the branch coupling members, the lateral opening and the saliva ejector being toward the lower end of said casting, and the drainage passage arranged to house a gold trap in the upper end thereof.

14. In a cuspidor, a bowl arranged for support on a drain housing, having an eccentric drainage outlet arranged for registry with such drain in said housing.

15. As an element in a cuspidor construction a bowl, the bowl having an axial extension, a passage being formed in the extension, a shoulder formed on the bowl arranged to support a gold trap extending through the passage and eccentric to the said bowl.

16. In a cuspidor, a support including a water distributing element having an eccentric drain therein, and an annular bowl coupling member, a bowl, an axial extension on the bowl arranged for registry with the coupling member and having an eccentric drainage outlet in said extension registering with the drain on the element and means for coupling the bowl and support.

17. In a cuspidor the combination with an annular support of a generally annular distributing head and an annular bowl mounted on the head a drain pipe in the support substantially concentric with the center or axis thereof, a drainage passage being formed in the head the major portion of which is laterally disposed relative the axis of the support but terminating in a concentric annular outlet registering with the drain pipe in said support, the bowl having a concentric annular extension having an eccentrically disposed drainage outlet in registry with the drainage passage of the head, a water supply pipe housed in the support and communicating water supply ducts in the head laterally disposed therein relative the drainage passage, and valves mounted in the head adjacent the supply ducts operating means therefore projecting laterally from the head beneath the bowl and above the support.

18. A cuspidor bowl having a concentric axial extension threads being cast on the extension positioning means formed in the end of the extension the inner surface of the bowl converging in an outlet eccentrically positioned in the outlet extension, the whole arranged to engage a support having an annular coupling member and an eccentric drainage passage, with cooperating positioning means engageable with the first means to effect registry of the outlet with the drainage passage.

19. In a cuspidor the combination with a bowl of a supporting head and a branch, a cuspidor water supply pipe housed in the branch, a conduit in the head communicating with said supply pipe embedded in the head, the head having a drainage passage communicating with the bowl and with the branch, a supply duct being formed in the head laterally of the drainage passage, valves forming a communication between the conduit and said duct at a point remote from said branch, the conduit being out of contact with the drainage passage.

20. In a cuspidor, the combination with a bowl having an eccentric outlet in a concentric extension, a unitary distributing and drainage head, an annular coupling member registering with the extension of the bowl, the head having a drainage passage of generally trapezoidal outline one face of which is formed by a relatively thickened wall of the head, a conduit in the head extending about said drainage passage, a valve located in the thickened wall in communication with said conduit, valve control means projecting from said wall, a hollow branch coupled to said head on the opposite side from said valve control means, a cuspidor supply pipe housed in the branch and connected to said conduit, a gold trap suspended from the bowl below the level of said conduit, and means for supplying water to said valve.

21. In a cuspidor, the combination with a bowl, of a support, a unitary head interposed between the bowl and the support, a water supply pipe in the support, a drain pipe in the support, a hollow branch mounted on the head, a tumbler bowl mounted on the branch, cuspidor and tumbler supply pipes housed in the branch, water supply ducts being formed in the head in communication with the water supply pipe, laterally extending conduits connecting the cuspidor and tumbler supply pipes and the water supply ducts, controlling means for the conduits, a saliva ejector discharge tube mounted in the head, the saliva ejector, the bowl, the head, the tumbler bowl and the branch all having communicating discharge passages communicating with the drain pipe, the water supply system and the drainage system thus formed being completely housed except for the extreme discharge nozzles of the cuspidor and tumbler supply pipes.

22. In a cuspidor, the combination with a unitary distributing and drainage element, and a hollow branch, of a cuspidor bowl mounted on the element and a tumbler bowl mounted on the branch, the element, the bowl, the branch and the tumbler bowl having communicating drainage passages, a trap mounted in the cuspidor bowl and extending in to the drainage passage of the element, a saliva ejector mounted in the element and discharging downwardly into the drainage passage thereof, below the trap, the arrangement being such that the saliva is discharged into the drainage passage of the element while entrapped air discharged therewith is vented through the drainage passages of the branch and tumbler bowl.

23. In a cuspidor, a drainage branch, a pipe housed in said branch, a substantially horizontal shoulder formed on the branch and having a vertical opening, a nozzle, a cuspidor saliva mouth piece hook having a flattened end, said end having an opening, means engaging the nozzle, the pipe and the hook to form a communication between the pipe and nozzle, and simultaneously to anchor the hook on said shoulder.

24. In a cuspidor, a tumbler bowl having an outlet, a sloping surface draining toward the outlet, and a plurality of ribs of substantially triangular outline formed on said surface, their upper surfaces being in a common plane.

25. In a cuspidor, a tumbler bowl having an outlet and a peripheral rim, the surface between the rim and the outlet having a plurality of ribs the upper surfaces of which are in a common plane, sloping drainage grooves being formed between the ribs and connected thereto by generally vertical merging surfaces, the ribs terminating at the outlet in rounded points to preclude undesired tripping engagement with an inserted tumbler.

26. In a cuspidor, the combination with a tumbler bowl having a drainage outlet, a peripheral guiding rim, a plurality of ribs having upper plane surfaces, and having sloping grooves between the ribs, the grooves and ribs having substantially equal areas and connected to each other and with the drainage outlet by curved surfaces, of a tumbler arranged for positioning in the bowl with guiding association with the rim, and sliding supporting association with the ribs.

27. In a cuspidor, a distributing head having a substantially vertical drainage passage, valve means disposed in the head at one side of the passage, a discharge conduit substantially horizontally disposed in the head out of contact with the drainage passage extending from the valve means to a point peripherally spaced from the valve means, so arranged as to permit actuation of the valve means without interference with connections to the discharge conduit and so that such connections may be at substantially the same level as the valve means to secure compactness of the distributing head.

In testimony whereof, I affix my signature.

CLARENCE W. MOORE.